United States Patent
Rokhsaz et al.

[11] Patent Number: 6,144,473
[45] Date of Patent: Nov. 7, 2000

[54] METHOD AND APPARATUS FOR TRANSCEIVING INFRARED SIGNALS

[75] Inventors: Shahriar Rokhsaz; Mathew A. Rybicki; H. Spence Jackson, all of Austin, Tex.

[73] Assignee: Sigmatel, Inc., Austin, Tex.

[21] Appl. No.: 08/871,041

[22] Filed: Jun. 9, 1997

[51] Int. Cl.[7] ........................... H04B 10/00
[52] U.S. Cl. ................. 359/152; 359/153; 455/63; 455/78
[58] Field of Search ................. 359/152, 153; 455/24, 63, 78, 232.1, 234.1

[56] References Cited

U.S. PATENT DOCUMENTS

| | | | |
|---|---|---|---|
| 4,048,561 | 9/1977 | Wilcox et al. | 455/78 |
| 4,907,291 | 3/1990 | Yamamoto | 455/78 |
| 4,980,660 | 12/1990 | Nakamura et al. | 455/78 |
| 5,426,666 | 6/1995 | Kato | 455/63 |
| 5,564,020 | 10/1996 | Rossi | 359/152 |
| 5,566,359 | 10/1996 | Corrigan | 455/78 |
| 5,574,587 | 11/1996 | Krokel et al. | 359/153 |
| 5,579,144 | 11/1996 | Whitney | 359/153 |

*Primary Examiner*—Jeffery A. Hofsass
*Assistant Examiner*—John Tweel, Jr.
*Attorney, Agent, or Firm*—Timothy W. Markison

[57] ABSTRACT

A method and apparatus for transceiving data over a wireless communication path with minimal effects from cross-talk is accomplished by a receiving circuit, a transmission circuit, and an interference cancellation circuit. The receiving circuit includes an amplifier and a scaling circuit which operate upon input data signals to produce a scaled representation thereof having high pulse with fidelity. The amplifier circuit and scaling circuit each include adjustable circuitry which are configured based on the magnitude of the received data signals. The interference cancellation circuit provides a signal to the amplifier circuit and scaling circuit to bias the respective adjustable circuitry to an initial operating level when the transmission circuit is transmitting data and/or upon completion of such transmissions.

13 Claims, 5 Drawing Sheets

METHOD AND APPARATUS FOR TRANSCEIVING INFRARED SIGNALS

FIELD OF THE INVENTION

This invention relates generally to transceiving data and more particularly to transceiving data over an infrared, or other wireless, transmission path.

BACKGROUND OF THE INVENTION

Transceiving data over an infrared transmission path between two devices is known. For example, infrared is used to transceive data between a remote controller and a television, a radio, an audio-amplifier, a video cassette recorder, etc.

To transceive data over an infrared ("IR") path between two devices, each device needs to be equipped with an IR receiving circuit and an IR transmission circuit. The IR receiving circuit includes a light receiving diode that receives data via the IR path. The IR receiving circuit further includes an amplifier section and a data detection circuit which are designed to accommodate a large dynamic range input signal. For example, the magnitude of the input data may vary greatly from 10 mAmps (when the devices are relatively close, i.e., less than 10 centimeters apart) to 100 nAmps (when the devices are relatively far apart, i.e., greater than 1 meter apart).

The IR transmission circuit includes a light transmitting diode which transmits data over the IR path. The light transmitting diode is pulsed on and off at a given frequency (2 microsecond pulses for amplitude shift keying, 125 nanosecond pulses for four pulse position modulation). The power level at which the diode is pulsed is at a fixed level such that when it is on, it is drawing at least 10 mAmps.

When both the IR receiving circuits and IR transmission circuit are included in the same device, the IR receiving circuit "picks up" the IR signals being transmitted by the IR transmission circuit. This is sometimes referred to as cross-talk. When the IR receiving circuit and IR transmission circuit are on the same IC, the cross-talk is even more pronounced. Cross-talk, however, is controlled by employing echo cancellation circuitry. In essence, echo-cancellation circuitry rejects the data received by the IR receiving circuit when the IR transmitting circuit is transmitting. While echo-cancellation eliminates most of the effects of cross-talk, it does not eliminate them all. For example, the magnitude of the cross-talk signal received by the IR receiving circuit may be considerably greater than an actual data signal. When this occurs, the IR receiving circuit is biased to receive a larger magnitude data signal than may actually be received from the other device, thereby causing the IR receiving circuit to miss low magnitude data signals. Similar missed data signals occur for other wireless transceiving circuits.

Therefore, a need exists for a method and apparatus that further reduces the effects of cross-talk in wireless transceiving circuits.

DETAILED DESCRIPTION OF THE DRAWINGS

Generally, the present invention provides a method and apparatus for transceiving data over a wireless communication path with minimal effects from cross-talk. This may be accomplished by a receiving circuit, a transmission circuit, and an interference cancellation circuit. The receiving circuit includes an amplifier and a scaling circuit which operate upon input data signals to produce a scaled representation thereof having high pulse width fidelity. The amplifier circuit and scaling circuit each include adjustable circuitry which are configured based on the magnitude of the received data signals. The interference cancellation circuit provides a signal to the amplifier circuit and scaling circuit to bias the respective adjustable circuitry to an initial operating level when the transmission circuit is transmitting data and/or upon completion of such transmissions. With such a method and apparatus, the present invention provides a data transceiving circuit that is more adept at receiving low-magnitude data signals because it is not improperly biased from received cross-talk data signals.

Figure 1:
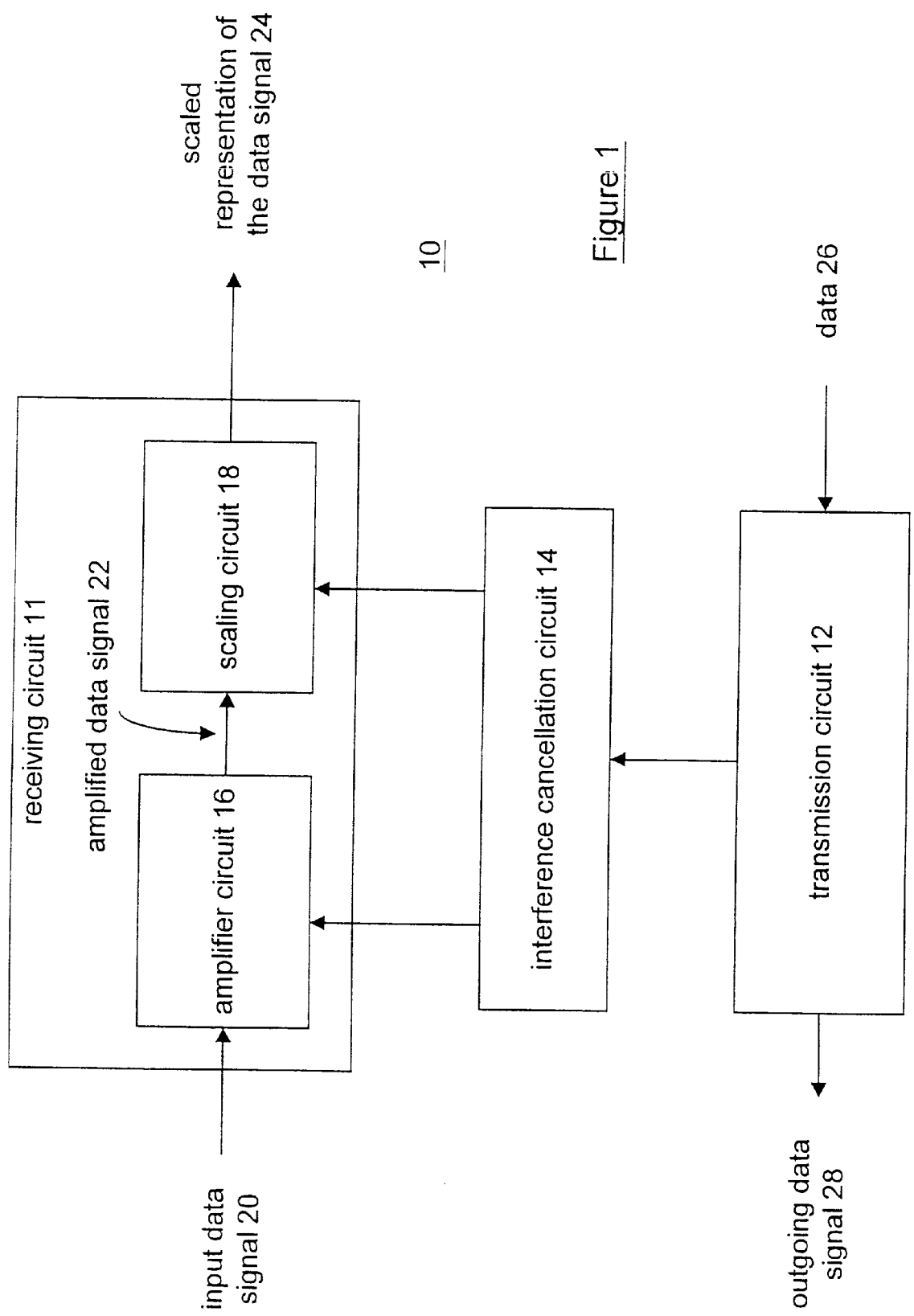
FIG. 1 illustrates a schematic block diagram of a data transceiving circuit which is in accordance with the present invention.

The present invention can be more fully described with reference to FIGS. 1 through 5. FIG. 1 illustrates a schematic block diagram of a data transceiving circuit 10 which includes a receiving circuit 11, a transmission circuit 12, and an interference cancellation circuit 14. The receiving circuit 11 includes an amplifier circuit 16 and a scaling circuit 18. In operation, the receiving circuit 11 receives an input data signal 20 via the amplifier circuit 16 which amplifies the input data signal 20 to produce an amplified data signal 22. The amplifier circuit 16 includes an adjustable gain which is adjusted, or biased, based on the magnitude of the input data signal.

The amplified data signal 22 is provided to the scaling circuit 18 which, based on an adjustable threshold, produces a scaled representation of the amplified data signal 22. The scaled representation of the data signal 24 is further based on the supply voltage and/or necessary magnitudes to achieve appropriate logic states. For example, if a logic 1 state were required, the scaled representation of the data signal would have to have at least a 2.2 volt magnitude for a 3 volt circuit.

The transmission circuit 12 receives data 26 and produces outgoing data signals 28 therefrom. The data 26 has already been modulated based on the particular modulation scheme being employed. For example, if the modulation scheme employed is for amplitude shift keying ("ASK"), the data represents a logic 1 when a 500 kilohertz pulse is present and represents a logic 0 when no 500 kilohertz pulse is present. Alternatively, the data 26 may be modulated using four pulse position modulation ("4 PPM") wherein the data is a 125 nanosecond pulse located within one of four locations of a particular time slot, or chip. With the data already modulated, the transmission circuit 12 converts the wireline data to wireless data.

When the transmission circuit 12 is transmitting the outgoing data signal 28, the interference cancellation circuit 14 provides a control signal to the amplifier circuit 16 and the scaling circuit 18. The signal provided to circuit 16 and 18 causes the amplifier circuit 16 to set its adjustable gain to an initial operating setting and the scaling circuit 18 to set its adjustable threshold to an initial operating setting. Such initial operating settings may respectively set the gain and threshold of the amplifier circuit 16 and the scaling circuit 18 to maximum sensitivity levels. In other words, both circuits are set in anticipation that the input data signal 20 will be received at its lowest magnitude.

Figure 2:
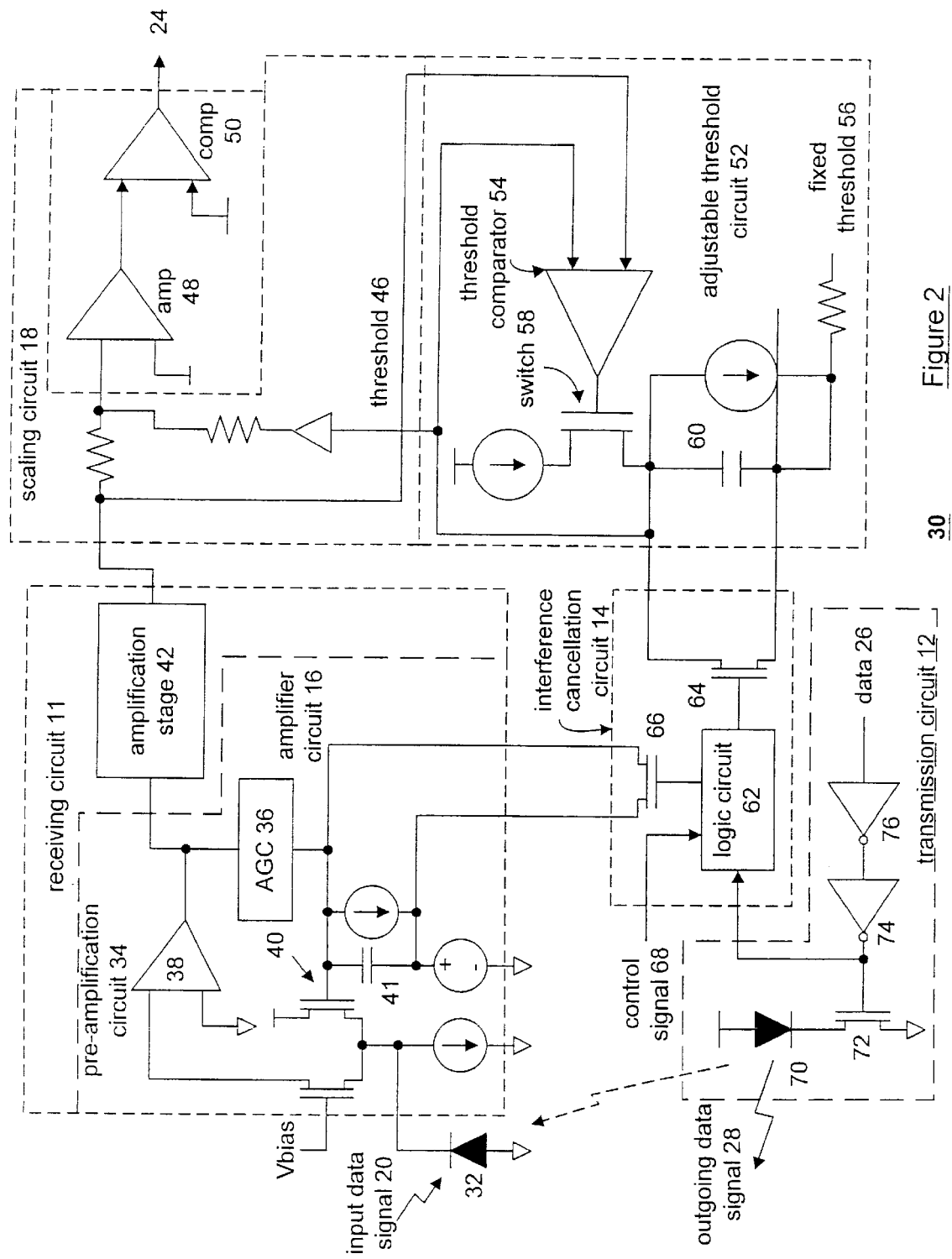
FIG. 2 illustrates a schematic block diagram of an alternate data transceiving circuit which is in accordance with the present invention.

FIG. 2 illustrates a schematic block diagram of a data transceiving circuit 30 which includes the receiving circuit 11, the transmission circuit 12, and the interference cancellation circuit 14. The amplifier circuit 16 is shown to include a preamplification circuit 34 and an amplification stage 42. The amplification stage 42 amplifies, based on a fixed amplification factor, the output of the preamplification circuit 34 and provides such amplified signal to the scaling circuit 18.

The preamplification circuit 34 is shown to include an automatic gain control circuit 36, an amplifier 38, and a differential input circuit 40. As shown, the differential input circuit 40 includes a storage element 41, which may be a capacitor, a pair of differential transistors, a voltage bias source, and two current sources. The preamplification circuit 34 is coupled to a light sensing diode 32 and, from the signal provided by the light sensing diode, produces a preamplified data signal. A more detailed discussion of the preamplification circuit 34 is available in co-pending patent application Ser. No. 08/822,338, which is assigned to the same assignee as the present invention, and is entitled DATA DETECTION CIRCUIT HAVING A PREAMPLIFIER CIRCUIT.

The automatic gain control 36 of the preamplification circuit 34 is at least partially dependent upon the storage element 41. The larger the voltage across storage element 41, the lower the gain of the automatic gain control 36. Thus, if the storage element 41 were biased to a larger voltage, which would be representative of an input data signal having a relatively large magnitude, the automatic gain control circuit 36 would be at a lower gain. In this state, the output of amplifier 38 would not be sufficient to produce a reasonable output 24 if the received input data signal had a relatively small magnitude. Without the present invention, the storage element 41 would be biased, at times, to a level too high to accurately amplify relatively low magnitude input data signals. Such inadvertent biasing results from the cross talk signals received from the light transmitting diode 70 of the transmission circuit 12. The inclusion of the interference cancellation circuit 14 substantially eliminates the biasing effects of the cross-talk.

The interference cancellation circuit 14 is shown to include logic circuit 62, transistor 64, and transistor 66. The logic circuit 62 may be a resetable latch, or any other digital circuit that would enable transistors 64 and 66 when the transmission circuit 12 is transmitting data and/or upon its completion of transmitting data. The logic circuit 62 detects transmission via the inverters 74 and 76, or receives a control signal 68, and, as a result, activates transistor 66. When transistor 66 is activated, the voltage across the storage element 41 decreases thereby sensitizing the preamplification circuit 34 to receive a small magnitude input data signal. Such sensitivity is obtained because the automatic gain control circuit 36 is set to its maximum gain thereby substantially reducing the chance for missing a low magnitude input signal.

The scaling circuit 18 is shown to include a mixing circuit 48 and a comparator 50. The mixing circuit 48 combines the output of the amplification stage 42 with the threshold 46 produced by the adjustable threshold circuit 52. The mixed signal is then compared with a reference signal by comparator 50 to produce an output 24. Note that the output 24 is the scaled representation of the data signal. For a more complete discussion of the scaling circuit 18, which includes a peak detection circuit, refer to co-pending patent application Ser. No. 08/871,194, having the same assignee as the present patent application, and is entitled METHOD AND APPARATUS FOR DATA DETECTION WITH AN ENHANCED ADAPTIVE THRESHOLD.

The scaling circuit 18 is further shown to include an adjustable threshold circuit 52. The adjustable threshold circuit 52 includes a threshold comparator 54, a fixed threshold 56, a switch 58 and a storage element 60. In operation, the adjustable threshold circuit 52 produces a higher threshold value 46 when the voltage across storage element 60, or capacitor, increases. As such, when the voltage across storage element 60 is relatively large, it is reflective of an input data signal having relatively large magnitude. If the relatively large voltage across the storage element is due to cross-talk from the light transmitting diode 70 and the voltage is not reset, the scaling circuit 18 would under scale signals, thus providing unreliable data detection for relatively low magnitude input signals. The interference cancellation circuit 14, however, prevents this from occurring.

The interference cancellation circuit 14 is shown to include transistor 64 which is coupled in parallel with storage element 60. As coupled, when the logic circuit 62 enables transistor 64, the voltage across storage element 60 is reduced, thereby setting the adjustable threshold of the scaling circuit to its minimum setting. As further shown in FIG. 2, the transmission circuit 12 includes a pair of inverters 74 and 76 which are coupled to a transistor 72. When transistor 72 is active, light transmitting diode 70 is producing the outgoing data signal 28 and cross-talk signals.

Figure 3:
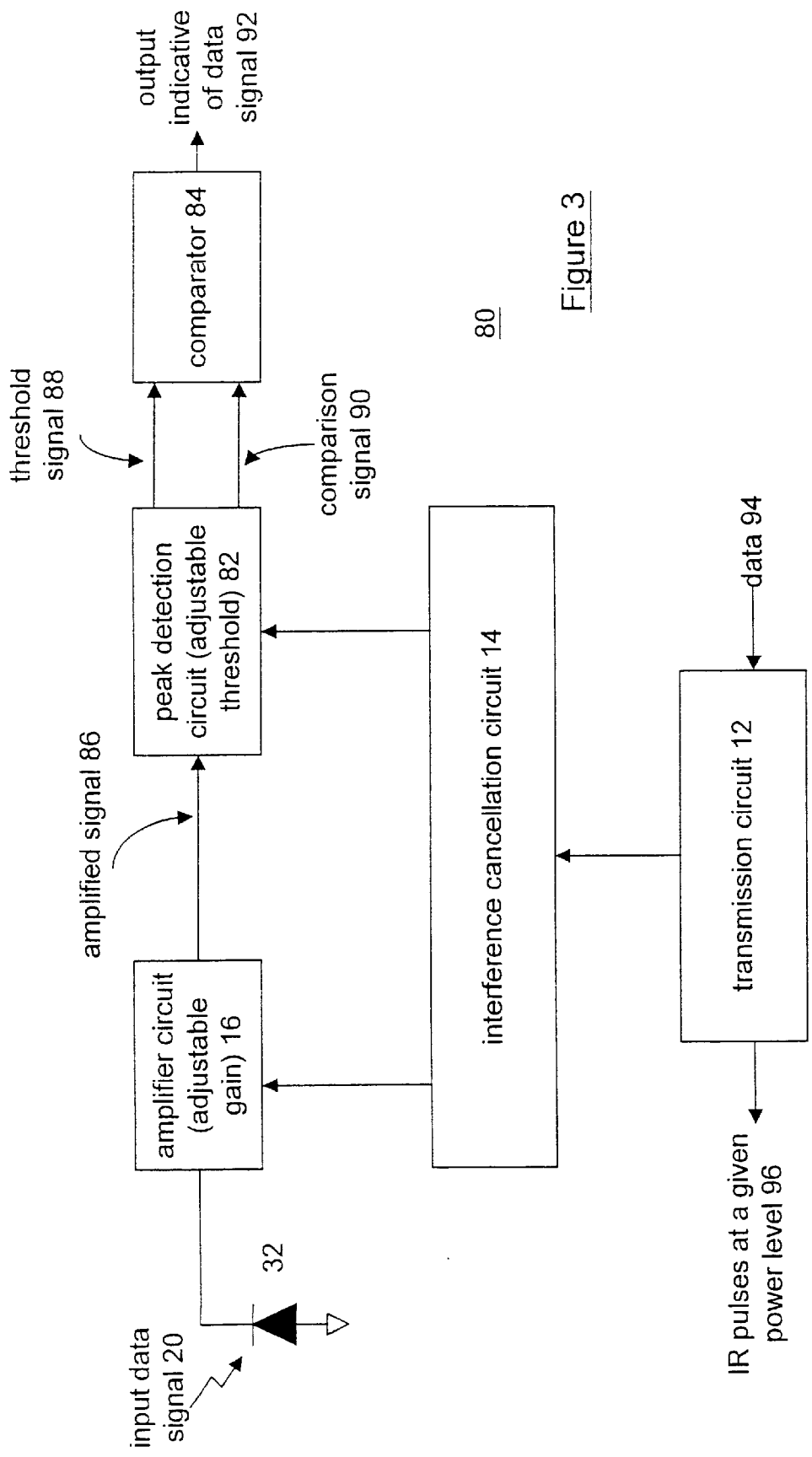
FIG. 3 illustrates another data transceiving circuit which is in accordance with the present invention.

FIG. 3 illustrates a schematic block diagram of another data transceiving circuit 80 which includes an amplifier circuit 16, a peak detection circuit 82, a comparator 84, the interference cancellation circuit 14, and the transmission circuit 12. The amplifier circuit 16 includes an adjustable gain and the peak detection circuit 82 includes an adjustable threshold. When receiving the input data signal, the adjustable gain and adjustable threshold are set based on the magnitude of incoming data signals 20. For example, when the data has a relatively low-magnitude (Eg. produced from a 100 nAmp signal being received by the light receiving diode), the adjustable gain is set its to maximum value and the adjustable threshold is set to its minimum value. Similarly, when the input data signals has relatively large magnitude (Eg. produced by a 10 mAmp signal being received by the light receiving diode), the adjustable gain is set to its minimal value and the adjustable threshold is set to its maximum value.

When the transmission circuit 12 is transmitting, and/or upon completion of transmission, the interference cancellation circuit 14 provides a control signal to the amplifier 16 and peak detection circuit 82. This control signal causes the respective circuits 16 and 82 to set the adjustable gain and adjustable threshold to a predetermined operating setting. The predetermined operating setting, may be a maximum value for the adjustable gain and a minimum value for the adjustable threshold. As one skilled in the art will readily appreciate, the predetermined operating settings may be set at other values depending on the particular design constraints of the circuit.

Having set the adjustable gain and adjustable threshold to the initial operating settings, the amplifier circuit 16 may receive an input data signal 20 via the light receiving diode 32. When this happens, the amplifier circuit 16, based on the adjustable gain, amplifies the input data signal 20 to produce the amplified signal 86. The amplified signal 86 is provided to the peak detection circuit 82 which based on the adjustable threshold being set to the initial operating setting, generates a threshold signal 88 and a comparison signal 90. The threshold signal 88 and the comparison signal 90 are provided to comparator 84 which generates an output indicative of the data signal 92. The output indicative of the data signal 92 may be a scaled representation of the input data signal 20. As is further shown in FIG. 3, the transmission circuit 12 receives data 94 and produces IR pulses at a given power level 96. As previously mentioned, the transmission circuit 12 transmits at a given power level such that maximum distance may be obtained between devices incorporating data transceiving circuitry as described herein.

Figure 4:
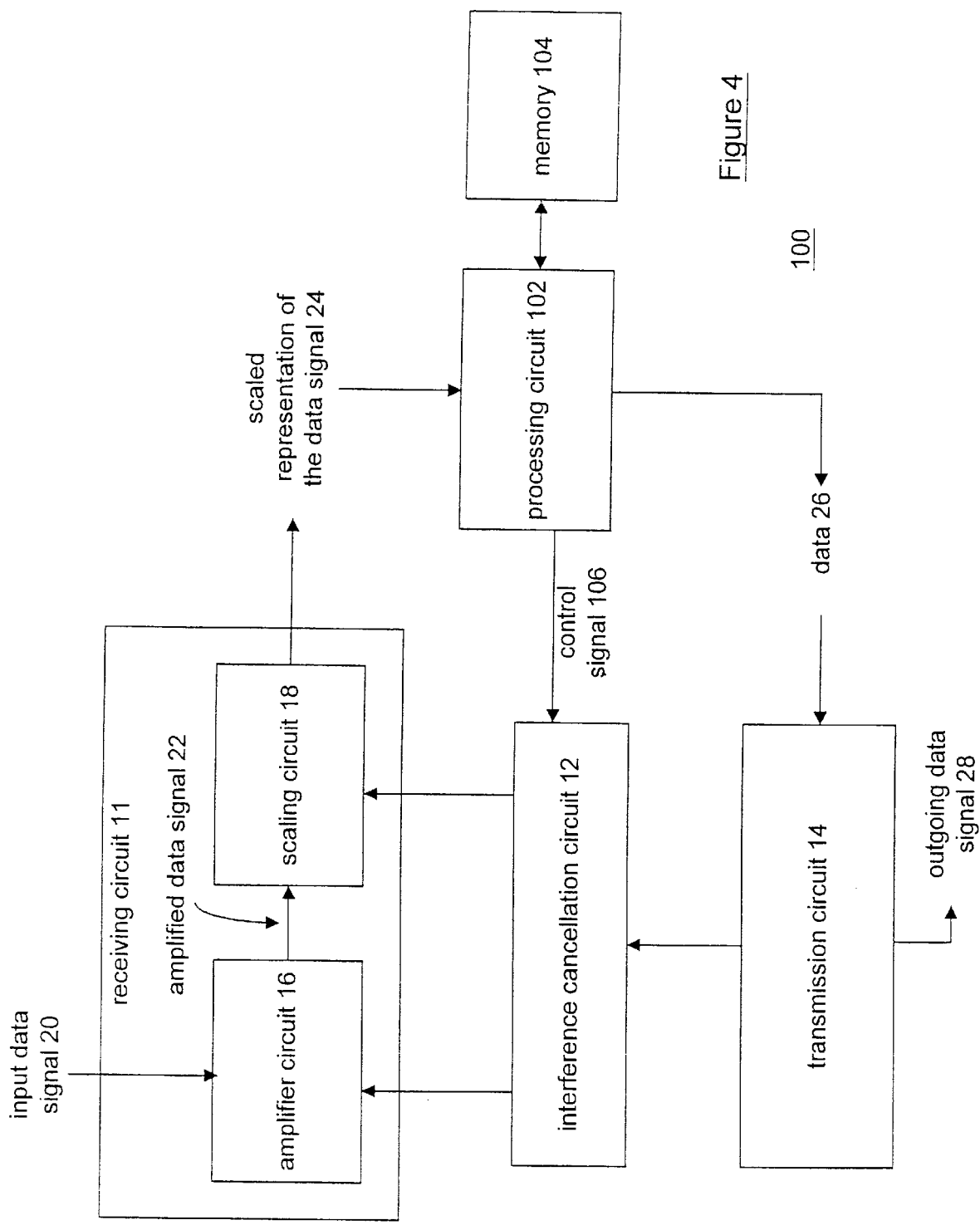
FIG. 4 illustrates a computer, and/or a computer peripheral device, which incorporates the data transmission circuit in accordance with the present invention.

FIG. 4 illustrates a computer and/or a computer peripheral device 100, that includes a receiving circuit 11, the interference cancellation circuit 12, the transmission circuit 14, a processing circuit 102, and memory 104. The function of the receiving circuit 11, the interference cancellation circuit 12 and the transmission circuit 14 are as previously discussed.

The processing circuit 102 may be a micro-controller, microprocessor, digital signal processor, a central processing unit, or any other device that manipulates digital data based on programming instructions. As shown, the processing circuit 102 is coupled to receive the scaled representations of the data signal. Upon receiving these signals, the processing circuit may execute programming instructions stored in memory 104. Note that if the system 100 is a computer, the memory 104 may be system memory. Further note that when the processing circuit 102 generates data 26 for transmission by transmission circuit 14, it may also generate a control signal 106 which is provided to the interference cancellation circuit 12. The control signal 106, which indicates that the transmission circuit 14 is transmitting, causes the interference cancellation circuit 12 to set the amplifier circuit and the scaling circuit to the initial operating settings.

By utilizing the data transceiving circuit 10 of FIG. 1, the system 100 is enabled to transceive data over wireless transmission paths, such as infrared, with greater reliability than past implementations. Such improvement is based on the interference cancellation circuit 14 resetting the amplifier circuit 16 and scaling circuit 18 to the initial operating setting whenever the transmission circuit is transmitting. When in this mode, the receiving circuit 11 is capable of accurately detecting low magnitude input data signals 20.

Figure 5:
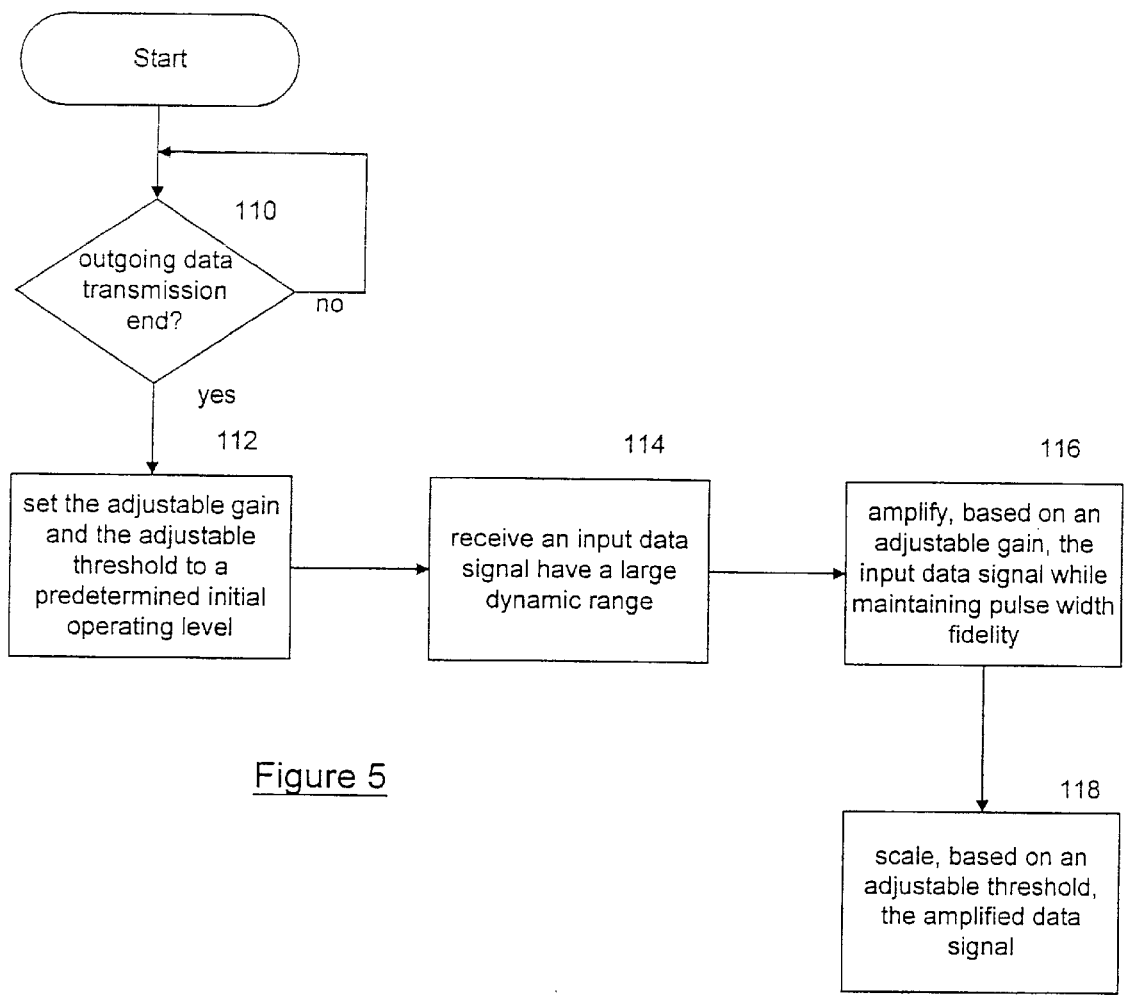
FIG. 5 illustrates a logic diagram which may be used to implement a data transceiving circuit in accordance with the present invention.

FIG. 5 illustrates a logic diagram which may be used to transceive data over a wireless transmission path. The process begins at Step 110 where a determination is made as to whether outgoing data transmission has ended. Once the outgoing data transmission has ended, the process proceeds to Step 112 where the adjustable gain and adjustable threshold of the receiving circuit are set to a predetermined initial operating level, or initial operating setting. Having done this, the process proceeds to Step 114 where an input data signal having a large dynamic range is received. Next, the process proceeds to Step 116 where the input data is amplified based on the adjustable gain. Such amplification maintains the pulse with fidelity of the input data signal. Finally, the process proceeds to Step 118 where the amplified data signal is scaled based on the adjustable threshold.

The preceding discussion has provided a method and apparatus for a wireless data transceiver. By incorporating the interference cancellation circuit, cross-talk problems of biasing the receiving circuit to undesirable levels has been substantially eliminated. As such, systems incorporating the data transceiver of the present invention can more accurately recover data from low-magnitude input data signals.

What is claimed is:

1. A transceiving circuit comprising:
    a receiving circuit that includes:
        an amplifier circuit operably coupled to receive an input data signal having a large dynamic range, wherein the amplifier circuit amplifies the input data signal while maintaining pulse width fidelity of the input data signal to produce an amplified data signal;
        a scaling circuit operably coupled to receive the amplified data signal and to produce, therefrom, a scaled representation of the amplified data signal;
    a transmission circuit that transmits an outgoing data signal at a given power level when the transmission circuit is enabled; and
    interference cancellation circuit operably coupled to the receiving circuit, wherein the interference cancellation circuit provides a signal to at least one of the amplifier circuit and the scaling circuit when the transmission circuit is disabled, wherein the signal causes the amplifier circuit and the scaling circuit to reset to a predetermined initial operating level.

2. The transceiving circuit of claim 1 further comprising, within the amplifier circuit, a pre-amplification circuit and an amplification stage.

3. The transceiving circuit of claim 2 further comprises, within the pre-amplification circuit, an automatic gain control circuit and a differential input circuit having a capacitance.

4. The transceiving circuit of claim 3 further comprises, within the interference cancellation circuit, a switch operably coupled to the capacitance input circuit, wherein the switch reduces operating voltage of the capacitance when the signal is received.

5. The transceiving circuit of claim 1 further comprises, within the scaling circuit, an adjustable threshold circuit, a mixer, and a comparator.

6. The transceiving circuit of claim 5 further comprises, within the adjustable threshold circuit, a storage capacitor.

7. The transceiving circuit of claim 6 further comprises, within the interference cancellation circuit, a switch operably coupled to the storage capacitor, wherein the switch reduces operating voltage of the storage capacitor when the signal is received.

8. An infrared transceiving circuit comprising:
    an infrared receiving circuit that includes:
        a light receiving diode;
        an amplifier circuit operably coupled to the light receiving diode, wherein the amplifier circuit includes a differential input having a capacitance and wherein the amplifier circuit amplifies a signal received by the light receiving diode to produce an amplified signal;
        peak detect circuit operably coupled to receive the amplified signal, wherein the peak detect circuit includes an adjustable threshold circuit that includes a capacitance to establish a threshold signal and a data comparison signal; and
        a comparator operably coupled to receive the threshold signal and the data comparison signal and to produce, therefrom, an output indicative of the data signal;
    a transmission circuit that includes a light transmitting diode which transmits infrared pulses at a given power level; and an interference cancellation circuit that provides a signal to the amplifier circuit and the peak detection circuit when the transmission circuit is disabled, wherein the signal causes voltage of the capacitance of the amplifier and the peak detection circuit to reset to a predetermined initial operating level.

9. A method for transceiving data, the method comprising the steps of:

receiving an input data signal having a large dynamic range;

amplifying, based on an adjustable gain, the input data signal while maintaining pulse width fidelity of the input data signal to produce an amplified data signal;

scaling, based on an adjustable threshold, the amplified data signal and to produce a scaled representation of the amplified data signal;

setting the adjustable gain and the adjustable threshold to a predetermined initial operating level when transmission of an outgoing data signal at a given power level has ended.

10. A computer comprising:

a central processing unit;

system memory that stores data and programming instructions, wherein at least a portion of the programming instructions, when read by the central processing unit, causes the central processing unit to prepare data for transmission to a computer peripheral and to receive data from the computer peripheral; and a wireless transceiving circuit that includes:
    a receiving circuit that receives, via a wireless transceiving path, the data from the computer peripheral;
    a transmission circuit that transmits the data to the computer peripheral over the wireless transceiving path; and
    interference cancellation circuit that provides a signal to the receiving circuit when the transmission circuit has ended transmission of the data to the computer peripheral, wherein the signal causes the receiving circuit to reset to an initial operating setting.

11. The computer of claim 10 further comprises, within the receiving circuit, a light receiving diode that receives the data from the computer peripheral;

an amplifier circuit operably coupled to the light receiving diode, wherein the amplifier circuit includes a differential input, which is reset to the initial operating setting when the signal is received, and wherein the amplifier circuit amplifies the data received by the light receiving diode to produce an amplified signal;

peak detect circuit operably coupled to receive the amplified signal, wherein the peak detect circuit includes an adjustable threshold circuit, which is reset to the initial operating setting when the signal is received, and wherein the peak detection circuit establishes a threshold signal a data comparison signal; and a comparator operably coupled to receive the threshold signal and the data comparison signal and to produce, therefrom, an output indicative of the data signal.

12. A computer peripheral comprising:

a processing circuit;

system memory that stores data and programming instructions, wherein at least a portion of the programming instructions, when read by the processing circuit, causes the processing circuit to receive data from a computer and to prepare data for transmission to the computer; and a wireless transceiving circuit that includes:
    a receiving circuit that receives, via a wireless transceiving path, the data from the computer;
    a transmission circuit that transmits the data to the computer over the wireless transceiving path; and
    interference cancellation circuit that provides a signal to the receiving circuit when the transmission circuit has ended transmission of the data to the computer, wherein the signal causes the receiving circuit to reset to an initial operating setting.

13. The computer peripheral of claim 12 further comprises, within the receiving circuit, a light receiving diode that receives the data from the computer;

an amplifier circuit operably coupled to the light receiving diode, wherein the amplifier circuit includes a differential input, which is reset to the initial operating setting when the signal is received, and wherein the amplifier circuit amplifies the data received by the light receiving diode to produce an amplified signal;

peak detect circuit operably coupled to receive the amplified signal, wherein the peak detect circuit includes an adjustable threshold circuit, which is reset to the initial operating setting when the signal is received, and wherein the peak detection circuit establishes a threshold signal a data comparison signal; and a comparator operably coupled to receive the threshold signal and the data comparison signal and to produce, therefrom, an output indicative of the data signal.

* * * * *